Figure 1:
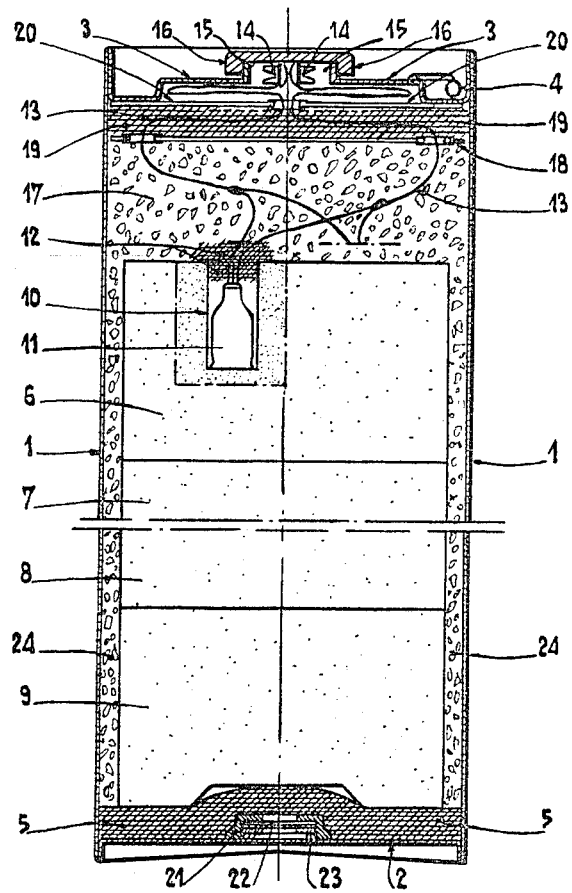

INVENTORS
JEAN MONI
PHILIPPE LE CHARTIER-SEDOUY
BY JACQUES THEVENEAU
McDougall & Hersh ATTYS.

United States Patent Office 3,276,846
Patented Oct. 4, 1966

3,276,846
APPARATUS FOR THE PRODUCTION OF
RELATIVELY PURE OXYGEN
Jean Moni, Traverse Bovis, Philippe le Chartier de Sedouy, St. Germain en Laye, and Jacques Théveneau, Indret, France, assignors to Societe Universelle de Produits Chimiques et d'Appareillages and Ministere des Forces Armees (Marine), Paris, France
Filed Aug. 27, 1962, Ser. No. 219,387
Claims priority, application France, Aug. 30, 1961, 871,922
3 Claims. (Cl. 23—281)

This invention relates to a composition and apparatus for the generation of oxygen suitable for the purposes of respiration and other uses and it relates more particularly to such composition and apparatus capable of the continuous production of sufficiently pure oxygen at a rate suitable for use in respiration.

The concepts of this invention reside in the combination of ingredients which makes use of an alkali metal chlorate as a source of oxygen, a metal oxide as a catalyst for reducing the temperature of reaction for release of oxygen from the chlorate, and a metal as a fuel, the calories required for maintaining the reaction being supplied in whole or in part by heat released from the exothermic oxide of the reduction reaction taking place.

In the past, use has been made of organic carbonaceous fuels to produce a product which has been unsuitable for use in respiration because of the presence of substantial amounts of carbon dioxide and carbon monoxide. It is very difficult to eliminate the carbon dioxide and the carbon monoxide. As a result, the gaseous product is toxic in nature.

Attempts have also been made to produce oxygen suitable for respiration purposes by the use of reduced iron, but this fuel is mediocre and only partially consumed and further requires that the molten iron and chlorate be cast in a special receptacle which is expensive and which is incapable of flexibility in use.

It is an object of this invention to provide a composition and apparatus for production of relatively pure oxygen and it is a related object to provide an apparatus and composition of the type described suitable for use in the production of oxygen for purposes of respiration or such other purposes as may be desired.

More specifically, it is an object of this invention to provide an apparatus and composition of the type described which is simple in construction and reliable in operation; which is effective to generate respirable oxygen at a uniform rate and over an extended period of time; which is capable of control for the generation of oxygen with minimum impurities or solids and from which impurities and solids can be removed in a simple and efficient manner; in which the ingredients for reaction can be formulated into a system which can be easily and economically handled to produce a safe, low cost, and relatively inexpensive generator; and which is safe and efficient in operation.

These and other objects and advantages of this invention will hereinafter appear and for purposes of illustration, but not of limitation, an embodiment of the invention is shown in the accompanying drawing in which—

Figure 2:
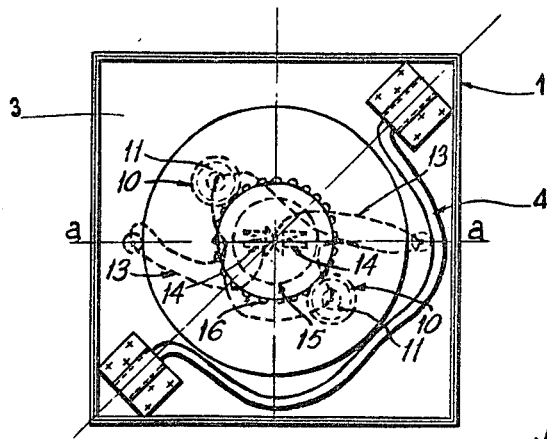

FIG. 1 is a schematic sectional elevational view of an apparatus embodying the features of this invention; and FIG. 2 is a top plan view of the apparatus shown in FIG. 1.

The concepts of this invention can be carried out by the mixture of an alkali metal chlorate with manganese dioxide as the catalyst and magnesium as a fuel with the amount of magnesium being variable in the system depending upon the distance of the particular phase of the mixture from the portion initially reacted with the amount of fuel being at a higher level in the area of the initial reaction for purposes of achieving the desired level or rate of reaction with the corresponding generation of heat required for continued support of the reaction, and at a lower level where the exothermic reaction taking place supplies at least some of the heat for maintaining the reaction thereby to require less fuel for its maintenance.

Such variation in fuel content from a higher level at the start of the reaction to a lower level as the reaction progresses into adjacent portions of the mixture permits for better control of the reaction whereby the oxygen is released at a more uniform rate and over a greater length of time thereby to enhance the use of the system as a respiratory device. Further, such control of the reaction for gradual and uniform release of oxygen enables better purification of the oxygen to be achieved by the removal of entrained gases and solids and it also becomes possible to control pressure conditions existing whereby a container of less strength and weight can be adopted to house the materials and thus decrease the overall weight, cost and dimension of the equipment.

In the area where the reaction is initiated, it is desirable to make use of a mixture containing at least 3 percent by weight of fuel, such as magnesium, and preferably an amount within the range of 3 to 8 percent by weight of magnesium. This amount is sufficient to maintain the reaction in the early stages following initiation of the reaction by other conventional ignition means. In the portions wherein the reaction is to be continued progressively after heat is made available from the initial stages of the reaction, the amount of magnesium or other fuel can be reduced but not below a minimum of about 1.2 percent by weight of the composition and it is preferred to maintain the concentration of magnesium or other fuel in such other portions within the range of 1.2 to 5 percent by weight of the composition although as much as 8 percent by weight can be employed. The amount of manganese dioxide, when employed, may range between 4 to 6 percent by weight.

A number of advantages are to be derived from a system of the type described. For example, the ingredients can be combined in the form of agglomerates for loading into the reaction vessel thereby to eliminate the difficult and expensive processes for casting the fused ingredients of the type previously employed. The oxygen yield is markedly increased and such oxygen is made available at a more uniform rate and over a greater period of time and at a level which can be better controlled for use in respiration. The components of the oxygen generator of this invention have been designed to include the following ingredients which are given by way of illustration, but not by way of limitation, since the reaction for oxygen generation can be carried out in the absence of one or more of said ingredients other than ingredients (1) and (2) below:

(1) The reaction load comprising the mixture of an alkali metal chlorate, magnesium and manganese dioxide;

(2) At least one ignition device or means for initiation of the oxide-reduction reaction between the chlorate-manganese oxide and magnesium;

(3) Means, preferably anhydrous calcium oxide, for fixing the released gases;

(4) A filtering means for the removal of solids which may be carried as an impurity along with the generated oxygen; such impurity may be, for example, an alkali metal chloride aerosol formed during the reaction of the chlorate;

(5) A means, such as a packing, for confining the reactive ingredients in a manner to minimize displacement and/or for providing a thermal insulation for the apparatus;

(6) A housing in which the various elements may be arranged and which is capable of withstanding the temperatures and pressure conditions existing;

(7) A means functioning as a relief valve which operates automatically to relieve pressure in the event of any excesses which might inadvertently develop.

The active ingredients, namely the chlorate, manganese oxide and magnesium, are formulated into a mixture and agglomerated into a granular substance which can be packed into the container and held in the desired arrangement within the container by a packing in the form of another granular material. The chemical composition of the agglomerates may thus be varied. This enables a composition richer in magnesium to be used for the agglomerate or agglomerates first subjected to ignition for initiation of the reaction thereby to facilitate the ignition. The other agglomerates may be formulated to contain a smaller quantity of magnesium, sufficient to continue the oxygen producing reaction although insufficient for originally initiating the reaction from the cold state. The proportion of magnesium can be the same in all agglomerates which are not relied upon originally to initiate the recation upon ignition or it can decrease in proportion to the distance of the agglomerates from those originally relied upon to initiate the reaction upon ignition. The duration and yield of the reaction can thereby be increased, purification is facilitated by reason of the smoothness of the reaction and by reduction in the rate of the gaseous flow and instantaneous heat emission is materially reduced.

In practice, when the ignition device or devices are activated, the device emits an intense heat which causes magnesium to burn in the presence of the alkali metal chlorate. The heat of the reaction causes chlorate to decompose, the reaction being catalyzed by the presence of the manganese dioxide to enhance the release of oxygen. The oxygen is freed from entrained impurities and solids by passage through filtering layers provided for such purpose.

With reference now to the drawing, the apparatus comprises a casing 1 made of thin metal sheeting of a gauge sufficient to resist the pressure and temperature conditions prevailing in the apparatus under the conditions existing during reaction, a cover 3 and a retractable handle 4 which is fixed to the upper part of the casing.

A packing 5, formed of glass fiber or other porous thermal insulating material, is provided in the lower end portion of the casing. The agglomerates, which contain sodium chlorate as the alkali metal chlorides, are subdivided into four sections, 6, 7, 8 and 9, which together rest on the layer of packing 5.

The upper section 6 is formed with a pair of cavities 10 arranged to accommodate ignition flasks 11 and which are closed or covered with a pad of asbestos fiber 12. The flasks 11, which may be in the form of an aluminum container, are adapted to house a mixture of equal parts by weight of potassium permanganate and iron filings and a conventional igniter such as electrical contacts. The leads 13 for the igniter are connected in parallel and terminate at connecting rivets 14 in a terminal 15 onto which is screwed a protective stopper 16. The upper section 6 has a magnesium content of 4 percent to increase inflammability and initiate reaction of the cold materials while the remainder of the sections 7, 8 and 9 are formulated to contain 2 percent of magnesium. The lower section 9 has a housing in its bottom side to accommodate the bulge formed by a relief valve provided in the lower wall of the casing. The two sections 6 and 9 and the two intermediate sections 7 and 8 are centered in the casing and packed with granular lime 24 which aids in purifying and filtering the formed gases.

Between the upper part of the agglomerate section 6 and the cover 3 there is provided a chemical purifying layer 17 formulated of soda lime for absorbing impurities. The layer 17 is covered with a metal grid 18 provided with eyelets for the passage of the two connecting wires 13. Next there is provided a physical filtering layer 19 formed of glass fiber and the like filtering substance which is adapted to remove solid particles entrained in the gaseous stream. The filtering layer 19 is covered by a grid 20 provided with an eyelet for the passage of the connecting electrical wires 13.

The relief valve is constructed in the form of a valve body 21 welded onto the bottom wall or base of the casing. The valve comprises an aluminum disc 22 dimensioned to have a thickness and strength calculated to rupture in response to pressure above a predetermined level. Two washers enclose the aluminum disc and a stopper 23 is screwed into the valve body 21. In the event of an abnormal rise in the internal pressure, the valve becomes automatically operative by rupture of the disc 22 to relieve the pressure.

Ignition is effected by an electrical impulse from any suitable source, such for example as from a blaster or an ordinary electric battery.

An apparatus has been fabricated to embody the features of this invention with the following characteristics:

| | |
|---|---|
| Weight | 11,800 kg. |
| Dimensions | 140 x 140 x 400 mm. |
| Lower packing 5 | 20 grams glass fiber. |
| Side packing 24 | 1 kg. granulated lime. |
| Chemical filter 17 | 1 kg. soda lime. |
| Physical filter 19 | 60 grams glass fiber. |
| Air-tightness of casing | under 50 g./cm.$^2$. |
| Minimum volume of respirable oxygen emitted | 2,000 litres. |

It will be understood that the foregoing is given merely by way of illustration, but not by way of limitation, of a suitable construction and arrangement of an apparatus adapted for use in the practice of this invention.

We claim:

1. An apparatus for the preparation of oxygen at a rate and purity suitable for purposes of respiration comprising a housing having an outlet in one end, a pressure relief valve in said housing for the release of pressures beyond a predetermined minimum, a body of reactive ingredients in the form of dry agglomerates consisting essentially of the mixture of an alkali metal chlorate, manganese dioxide and magnesium, at least one ignition means in communication with said reactive ingredients for initiation of the reaction to release oxygen, a filter layer between the mass of the reactive ingredients and the outlet for the removal of entrained particles from the released gases, a packing between the mass of reactive ingredients and the walls of the housing to stabilize the reactive ingredients within the housing, and a layer of a material between the mass of reactive ingredients and the outlet of the housing through which the released gases pass for reaction to remove gases other than oxygen and in which the amount of magnesium in the mixture of reactive ingredients varies from a higher concentration adjacent the ignition means to a lower concentration spaced from the ignition means and in which the amount of magnesium in the portion subject to initiation of the reaction ranges from 3 to 8 percent while the amount of magnesium in the portions spaced therefrom ranges from 1.2 to 8 percent.

2. An apparatus as claimed in claim 1 in which the packing between the mass of reactive ingredients and the walls of the housing comprises lime and in which the layer of material between the mass of reactive ingredients and the outlet of the housing comprises lime.

3. A shaped article for preparation of oxygen at a rate and purity for use in respiration from a combination of materials housed within the shaped article consisting essentially of the mixture of an alkali metal chlorate, magnesium dioxide and magnesium, and ignition means adjacent a portion of the mixture at one end of the shaped article, and in which the mixture in the end portion adjacent the ignition means contains more than 3% by weight of magnesium while the remainder of the mixture beyond the ignition means contains less magnesium but not less than 1.2% by weight, and in which the amount of magnesium in the mixture does not exceed 8% by weight in any portion thereof.

References Cited by the Examiner

UNITED STATES PATENTS

| | | | |
|---|---|---|---|
| 1,919,730 | 7/1933 | Koenig et al. | 23—221 X |
| 2,004,243 | 6/1935 | Hloch | 23—221 |
| 2,775,511 | 12/1956 | Geffroy et al. | 23—281 |

FOREIGN PATENTS

| | | |
|---|---|---|
| 9,772 | 1898 | Great Britain. |
| 451,170 | 7/1936 | Great Britain. |

MORRIS O. WOLK, *Primary Examiner.*
JAMES H. TAYMAN, Jr., *Examiner.*